US010285534B2

(12) United States Patent
Mori (10) Patent No.: US 10,285,534 B2
(45) Date of Patent: May 14, 2019

(54) CONTROLLED MOTORIZED BREWING UNIT

(75) Inventor: Peter Mori, Walperswill (CH)

(73) Assignee: Nestec S.A., Vevey (CH)

( * ) Notice: Subject to any disclaimer, the term of this patent is extended or adjusted under 35 U.S.C. 154(b) by 328 days.

(21) Appl. No.: 13/819,630

(22) PCT Filed: May 5, 2011

(86) PCT No.: PCT/EP2011/057233
§ 371 (c)(1),
(2), (4) Date: Feb. 27, 2013

(87) PCT Pub. No.: WO2012/025258
PCT Pub. Date: Mar. 1, 2012

(65) Prior Publication Data
US 2013/0167728 A1    Jul. 4, 2013

(30) Foreign Application Priority Data

Aug. 27, 2010    (EP) .................................... 10174412

(51) Int. Cl.
*A47J 31/44*    (2006.01)
*A47J 31/36*    (2006.01)
(Continued)

(52) U.S. Cl.
CPC .......... *A47J 31/446* (2013.01); *A47J 31/3604* (2013.01); *A47J 31/3623* (2013.01);
(Continued)

(58) Field of Classification Search
CPC ................ A47J 31/3604; A47J 31/3623; A47J 31/3633; A47J 31/407; A47J 31/446; A47J 31/58
(Continued)

(56) References Cited

U.S. PATENT DOCUMENTS 5,086,260 A    2/1992    Ito
5,255,594 A *  10/1993   Grossi ................. A47J 31/3619
                                                                99/287
(Continued)

FOREIGN PATENT DOCUMENTS

CN    201452867    5/2010
DE    202007005791    8/2008
(Continued)

OTHER PUBLICATIONS

Office Action issued in Russian Application 2013113574, dated Nov. 28, 2014, 8 pages.
(Continued)

*Primary Examiner* — Ibrahime A Abraham
*Assistant Examiner* — Frederick F Calvetti
(74) *Attorney, Agent, or Firm* — K&L Gates LLP (57) ABSTRACT

A motorized beverage machine (1) has a brewing unit (2) that comprises a first assembly (13) and a second assembly (14) cooperating together, each assembly (13,14) delimiting part of a brewing chamber (29) for containing an ingredient capsule (30). At least one of these assemblies (14) is: movable away from the cooperating assembly (13) into an open position within such machine for forming between said assemblies a passage (31) for inserting into and/or removing from the brewing unit the ingredient capsule (30); and movable to the cooperating assembly into a closed position for forming the brewing chamber (29). The machine comprises activation means including: a motor for driving the movable assembly between the open and closed positions and transmission means for transmitting the drive action of the motor to the movable assembly; water supply means for supplying heated water to brewing chamber; control means for controlling the drive action of the motor comprising means for measuring at least one electrical parameter rep-
(Continued)

resentative of the motor power consumption and for comparing the evolution of said measured parameter as a function of time during the transfer of the assembly from the open to the closed position to a set reference and means for providing an input to at least one of the activation means as a result of the compared evolution of the measured parameter to the set reference.

19 Claims, 4 Drawing Sheets (51) Int. Cl.
*A47J 31/40* (2006.01)
*A47J 31/58* (2006.01)

(52) U.S. Cl.
CPC ......... *A47J 31/3633* (2013.01); *A47J 31/407* (2013.01); *A47J 31/58* (2013.01)

(58) Field of Classification Search
USPC .................................... 99/295, 302 R, 302 P
See application file for complete search history.

(56) References Cited

U.S. PATENT DOCUMENTS

| | | | |
|---|---|---|---|
| 5,334,876 A | | 8/1994 | Washeleski et al. |
| 5,402,707 A | | 4/1995 | Fond et al. |
| 5,495,793 A | * | 3/1996 | Muis et al. ...................... 99/280 |
| 6,101,923 A | * | 8/2000 | Karg et al. .................. 99/289 D |
| 6,129,006 A | * | 10/2000 | Schmed ....................... 99/302 P |
| 6,345,570 B1 | * | 2/2002 | Santi ..................... A47J 31/368 |
| | | | 99/289 R |
| 6,807,898 B2 | * | 10/2004 | De Koning et al. ........ 99/289 R |
| 6,820,535 B2 | | 11/2004 | Fischer |
| 6,904,840 B1 | * | 6/2005 | Pfeifer ................ A47J 31/0668 |
| | | | 99/289 R |
| 7,210,401 B1 | * | 5/2007 | Rolfes et al. ............... 99/289 R |
| 7,461,584 B2 | * | 12/2008 | Blanc .................. A47J 31/3633 |
| | | | 99/280 |
| 7,562,618 B2 | | 7/2009 | Jarisch et al. |
| 8,272,319 B2 | * | 9/2012 | Jarisch ............... A47J 31/3638 |
| | | | 99/289 R |
| 8,479,640 B2 | * | 7/2013 | Gavillet .............. A47J 31/3628 |
| | | | 99/295 |
| 8,752,477 B2 | * | 6/2014 | Douma .......................... 99/288 |
| 8,915,177 B2 | * | 12/2014 | Gavillet .............. A47J 31/3623 |
| | | | 99/289 R |
| 2003/0089245 A1 | | 5/2003 | Kollep et al. |
| 2004/0112222 A1 | | 6/2004 | Fischer |
| 2004/0237793 A1 | | 12/2004 | Zurcher et al. |
| 2005/0193891 A1 | * | 9/2005 | Garson et al. .................. 99/279 |
| 2007/0068394 A1 | * | 3/2007 | Jarisch ................ A47J 31/3633 |
| | | | 99/279 |
| 2007/0135136 A1 | | 11/2007 | Boussemart et al. |
| 2008/0084172 A1 | | 4/2008 | Washington |
| 2009/0308258 A1 | * | 12/2009 | Boussemart ........ A47J 31/3633 |
| | | | 99/295 |
| 2010/0037779 A1 | | 2/2010 | Pecci et al. |
| 2010/0083844 A1 | | 4/2010 | Budweg |
| 2010/0173053 A1 | | 7/2010 | Ryser et al. |
| 2010/0282088 A1 | * | 11/2010 | Deuber et al. .................. 99/281 |
| 2012/0121764 A1 | * | 5/2012 | Lai ..................... A47J 31/3623 |
| | | | 426/77 |
| 2013/0152797 A1 | * | 6/2013 | Mori .................. A47J 31/3604 |
| | | | 99/280 |
| 2013/0269536 A1 | * | 10/2013 | Gavillet ............. A47J 31/3628 |
| | | | 99/295 |

FOREIGN PATENT DOCUMENTS

| | | |
|---|---|---|
| EP | 0056437 | 7/1982 |
| EP | 0118074 | 9/1984 |
| EP | 0512468 | 11/1992 |
| EP | 0512470 | 11/1992 |
| EP | 0627186 | 12/1994 |
| EP | 0736948 | 10/1996 |
| EP | 0937432 | 8/1999 |
| EP | 1050258 | 11/2000 |
| EP | 1296444 | 3/2003 |
| EP | 1646305 | 4/2006 |
| EP | 1767129 | * 3/2007 |
| EP | 2068684 | 6/2009 |
| EP | 2080457 | 7/2009 |
| JP | 2010519009 | 6/2010 |
| WO | 9847418 | 10/1998 |
| WO | 0064318 | 11/2000 |
| WO | 2005004683 | 1/2005 |
| WO | 2005019946 | 3/2005 |
| WO | 2007105249 | 9/2007 |
| WO | 2007135136 | 11/2007 |
| WO | 2008153576 | 12/2008 |
| WO | 2009043630 | 4/2009 |
| WO | 2013127476 | 9/2013 |

OTHER PUBLICATIONS

International Search Report for International Application No. PCT/EP2011/057233 dated Jul. 20, 2011, 3 pages.
Written Opinion of the International Searching Authority on International Application No. PCT/EP2011/057233 dated Jul. 20, 2011 5 pages.
Chinese Office Action for Application No. 2011800519304, dated Jan. 15, 2015, 11 pages.
Japanese Office Action for Application No. P2013-525194, Dispatch No. 178643, dated Apr. 21, 2015, 7 pages.
Australia Opposition for Application No. 2011295341, dated Nov. 2, 2015, 19 pages.
NXP Semiconductors "AN10513 Brushed DC Motor Control Using the LPC2101" Jan. 12, 2007.
Nxp Semiconductors "AN10661 Brushless DC Motor Control Using the LPC2141" Oct. 17, 2007.
Merz, Hermann "Elektrische Maschinen und Antriebe: Grundlagen und Berechnungsbeispiele fur Einsteiger", VDE Verlag, 2001.
Wikipedia printout "Motorschutz (Elektrotechnik)" May 31, 2010, available from https://de.wikipedia.org/wiki/Motorschutz_%28Elektrotechnik%29.
European Opposition for Application No. 11719510.7, dated Mar. 18, 2016, 6 pages.
Bunn "Bunn Autopod Sales Brochure", 2009.
Anonymous "Handbook of electric motors" New York; M. Dekker; London; Momenta, 2004, Ed. 2nd, Chapter 10.
Elmore, Walter A. "Protective relaying theory and applications" New York; Marcel Dekker, 2004, Ed. 2nd, Chapter 9.
Brochure entitled "Technical Analysis of Siemens Nespresso Machine" Mar. 20, 2006.
Restaurant Business "What's Brewing?", Apr. 1, 2010 (cited Apr. 1, 2014) available from http://www.restaurantbusinessonline.com/controlling-costs/restaurant-equipment/articles/what%E2%80%99s-brewing.
Eldorado Coffee "Bunn Autopod Brewer with Eldorado Coffee Pods", Aug. 12, 2008 (cited Apr. 1, 2014) available from https://www.youtube.com/watch?v=QQMPtbt1viM.
New Hampshire Coffee Roasting "Commercial Brew Machine FINAL.mov", Mar. 12, 2010 (cited Apr. 1, 2014) available from https://www.youtube.com/watch?v=16bgnznh-RE.
Bunn SAP Data Log, 2010, 1 page.
Bunn Autopod Sales Receipt, 2010, 1 page.
Bunn "Bunn Autopod Installation and Operation Guide", 2008.
Bunn "Bunn Autopod Technical Training Manual", 2009.
Siemens "TK70 Technical Manual", 2006.
Siemens "Free-Standing Appliances", 2006.
Siemens "Free-Standing Appliances", 2007.
Anonymous "The Insider: A weekly guide to spending" The Independent, Sep. 10, 2005, 4 pages.
Siemens "TK70N01 Operating Instructions", 2005.
"Technical analysis of Bunn AutoPod Machine" Mar. 10, 2006.

(56) References Cited

OTHER PUBLICATIONS

Bunn "Bunn Autopod Spare Parts Manual", 2008.
European Opposition for Application No. 11719510.7, dated Mar. 23, 2016, 9 pages.

* cited by examiner

CONTROLLED MOTORIZED BREWING UNIT

CROSS REFERENCE TO RELATED APPLICATIONS

The present application is a National Stage of International Application No. PCT/EP2011/057233, filed May 5, 2011, which claims priority to European Patent Application No. 10174412.6, filed Aug. 27, 2010, the entire contents of which are being incorporated herein by reference.

FIELD OF THE INVENTION

The present invention relates to a beverage machine for the preparation of a beverage from an ingredient capsule. More particularly, the machine has a motorized brewing unit and a control for closing the brewing unit in a convenient and safe manner.

For the purpose of the present description, a "beverage" is meant to include any human-consumable liquid substance, such as tea, coffee, hot or cold chocolate, milk, soup, baby food, etc. . . . A "capsule" is meant to include any pre-portioned beverage ingredient, such as a flavouring ingredient, within an enclosing packaging of any material, in particular an airtight packaging, e.g. plastic, aluminium, recyclable and/or biodegradable packagings, and of any shape and structure, including soft pods or rigid cartridges containing the ingredient.

TECHNICAL BACKGROUND

Certain beverage preparation machines use capsules containing ingredients to be extracted or to be dissolved and/or ingredients that are stored and dosed automatically in the machine or else are added at the time of preparation of the drink. Some beverage machines possess filling means that include a pump for liquid, usually water, which pumps the liquid from a source of water that is cold or indeed heated through heating means, e.g. a thermoblock or the like.

Especially in the field of coffee preparation, machines have been widely developed in which a capsule containing beverage ingredients is inserted in a brewing device. The brewing device is tightly closed about the capsule, water is injected at the first face of the capsule, the beverage is produced in the closed volume of the capsule and a brewed beverage can be drained from a second face of the capsule and collected into a receptacle such as a cup or glass.

Brewing devices have been developed to facilitate insertion of a "fresh" capsule and removal of the capsule upon use.

WO 2005/004683 and WO 2007/135136 relate to such brewing devices. The devices comprise a frame, a fixed holding part for the capsule, a movable holding part which is mounted relative to the frame in a sliding relationship, one or two knuckle joint mechanisms that provide a mechanical system which enables to close in a steady and fluid-tight manner the holding parts about the capsule while also resisting to the counter-force acting while re-opening and generated by the internal brewing pressure, and a handle for directly levering the knuckle joint mechanism. Such a device forms a simple assembly enabling insertion of the capsule by vertical fall through a passage in the frame and removal of the used capsule in the same direction as the insertion direction. The handle may serve to cover and uncover the passage for the capsule. The movable parts of the brewing device are actuated manually via the handle. The manual force required to move the movable parts varies during closure and opening of the machine and depends on the dimensional tolerances of the capsules used and the positioning and nature of the capsules as well as the temperature of the brewing unit.

WO 2009/043630 discloses a beverage preparation machine including a brewing unit having a front part with a passage for inserting a capsule into the brewing unit. The front part is arranged to telescope out of the machine's housing for uncovering the passage for inserting a capsule into the brewing unit and telescopes into the brewing unit for sliding the passage under the housing and thus covering the passage by the housing.

From a different approach, the actuation of the movable part of the brewing device may be motorized. EP 1 767 129 relates to a motor-driven extraction module for a capsule-based beverage production device. In this case, the user does not have to provide any manual effort to open or close the brewing device. The brewing device has a capsule insertion passage provided with a safety door assembled to the movable part of the brewing device via a switch for detecting an undesired presence of a finger in the passage during closure and prevent squeezing-injuries by stopping the motor before any finger is caught in the brewing device.

SUMMARY OF THE INVENTION

An object of the invention is to provide a motorized closure function of the brewing unit for providing more convenience in loading and ejection of the ingredient capsule and reducing user's intervention. Another object is to provide a safe operation by reducing the risk of injuries while using a motorized beverage machine. Another object is to provide added value functionalities such as semi-automatic or automatic brewing, rinsing and/or de-scaling modes. Another object is to control optimal conditions for rinsing and/or de-scaling the machine.

One or more of these objects are meet by a motorized brewing machine according to the independent claim(s). The dependent claims further provide solutions to these objects and/or additional benefits.

The invention relates to a motorized machine for preparing and dispensing a beverage and more particularly to a beverage machine having a motorized brewing unit. For instance, the machine is a coffee, tea, chocolate, cacao, milk or soup preparation machine. In particular, the machine is arranged for preparing within a beverage processing module a beverage by passing hot or cold water or another liquid through a capsule containing an ingredient, such as a flavouring ingredient, of the beverage to be prepared, such as ground coffee or tea or chocolate or cacao or milk powder.

Such beverage preparation typically includes the mixing of a plurality of beverage ingredients, e.g. water and milk powder, and/or the infusion of a beverage ingredient, such as an infusion of ground coffee or tea with water. For instance, a predetermined amount of beverage is formed and dispensed on user-request, which corresponds to a serving. The volume of such a serving may be in the range of 25 to 200 ml, e.g. the volume for filling a cup or mug, depending on the type of beverage. Formed and dispensed beverages may be selected from ristrettos, espressos, lungos, cappuccinos, café latte, americano coffees, teas, etc. . . . In particular, a coffee machine may be configured for dispensing espressos, e.g. an adjustable volume of 20 to 60 ml per serving, and/or for dispensing lungos, e.g. a volume in the range of 70 to 150 ml per serving.

In particular, the motorized beverage machine has a brewing unit that comprises a first assembly and a second assembly cooperating together, each assembly delimiting part of a brewing chamber for containing an ingredient capsule. At least one of these assemblies is:

movable away from the cooperating assembly into an open position within the machine for forming between the assemblies a passage for inserting into and/or removing from the brewing unit the ingredient capsule; and movable to (e.g. towards) the cooperating assembly into a closed position for forming the brewing chamber.

The assemblies are relatively movable to one another. One assembly may be fixed in the machine, e.g. in the main frame or outer housing of the machine, and the other assembly may be movable thereto. Alternatively, both assemblies may be movable in the machine, e.g. in the main frame or outer housing of the machine.

The machine comprises activation means that include:

a motor for driving the movable assembly of the brewing unit between the open and closed positions;

a transmission means for transmitting a drive action from the motor to the movable assembly, e.g. one or more transmission gears and/or belts and/or cardans;

water supply means for supplying heated water to the brewing chamber, e.g. a water source with a pump and/or a heater and a control unit such as a PCB with a controller and optional memory device and/or other electronic components (i.e. a PCBA "Printed Circuit Board Assembly"); and control means for controlling the drive action of the motor, e.g. a control unit such as a PCB with a controller or a PCBA.

In accordance with the invention, the motorized beverage machine comprises means for measuring at least one electrical parameter representative of the motor power consumption and for comparing the evolution of this measured parameter as a function of time during the transfer of the assembly from the open to the closed position to a set reference and means for providing an input to at least one of said activation means as a result of the compared evolution of said measured parameter.

Hence, the circumstances under which the assemblies are moved to the open and/or closed position can be monitored by monitoring the power consumption of the motor. In particular, the required mechanical output energy of the motor to produce a movement is directly linked to its consumed input energy, e.g. electric energy, can be measured.

The set reference may be based on a power consumption modelisation and/or an empiric power consumption measure under predetermined conditions, e.g. with or without ingredient capsule in the brewing unit, specific environment of use, etc. . . . The set reference typically includes a tolerance margin to take into account variations that may occur e.g. due to the environment of use and/or manufacturing tolerances and/or handling tolerances.

For example, the motor is controlled to produce an output movement, e.g. rotation of a rotor, at a predetermined speed and/or to operate at a predetermined input voltage for example at constant voltage. To maintain the predetermined speed and/or voltage, the input powering of the motor can be adjusted in line with the needed output powering, e.g. angular speed and torque (depending on the constraints under which the motor has to operate in a given circumstance). In particular, the power supply of the motor may be arranged to control the motor's input voltage and the motor can be arranged to draw the required amount of current needed to maintain the input voltage. By measuring the required motor input powering to maintain the desired motor output speed and/or the input voltage, the mechanical constraints exercised against the motor output can be determined. Such constraints may correspond to normal operation of the motorized machine, e.g. opening or closing the brewing unit assemblies with or without a capsule ingredient, or to an abnormal operation, e.g. an interference with an obstacle preventing normal opening or closing, such as a human body part e.g. a finger, caught inbetween the assemblies or inhibiting reopening of the assemblies, e.g. jamming of the brewing unit. In the former case (normal operation), the motorized beverage machine may be configured to allow a corresponding operation, e.g. beverage preparation or cleaning, or to carry it out automatically. In the latter case (abnormal operation), a safety mode may be provided, e.g. to stop closure or reopen the assemblies when an undesired obstacle is caught between the assemblies, or stop the motor when the brewing unit is jammed e.g. to prevent undesired stress in the machine and allow for example manual unjamming by a user and/or service person, as appropriate.

A safety input is typically provided to the motor when detecting an abnormal variation of the measured parameter relative to the set reference. The variation may be deemed abnormal when the measured parameter:

exceeds a level that is at least 20% above the set reference, in particular 30 or 40% thereabove such as 50% thereabove; and/or corresponds to a resistance against closure caused by the presence of an obstacle, in particular a human body part such as a finger, inbetween the assemblies moving towards the closed position and prior to reaching thereof, for example a resistance between the assemblies of the brewing unit in the range from 50 to 200 N, in particular from 75, 100 or 120 to 130 or 150 N.

Providing a reference set that includes a tolerance range, e.g. 20, 30, 40 or even 50% relative to a median or average reference set may be appropriate to take into account normal variations of mechanical effects occurring in the machine, such as variations of a friction coefficient, temperature and humidity as well as manufacturing tolerances.

The safety input may comprise inverting the motor action to move the movable assembly in open position or reducing or stopping the drive action of the motor.

The control means can be configured to detect the abnormal variation in comparison to a referential curve representing the normal evolution of the electrical parameter as a function of time corresponding to:

a mode in which the movable assembly is moved into a closed position with an ingredient capsule inserted in the brewing chamber (hereinafter the "Capsule closure mode"); and/or a mode in which the movable assembly is moved into a closed position with no capsule inserted in the brewing chamber (hereinafter the "Empty closure mode").

A water supply mode consisting of supplying heated water to the brewing chamber may be initiated when no abnormal variation of the measured parameter relative to the set reference has been detected and the assembly is in a closed position ("Capsule closure mode or empty closure mode"). The supplying of heated water may involve the circulation, e.g. by using a pump, of water from a source, e.g. a water tank, and/or the heating of water, e.g. continuous or batch heating, to the brewing chamber. The supply of heated water may be controlled, e.g. via one or more temperature sensors, pressure sensors and/or flowmeters, to adjust the heating and flow characteristics of the supplied heated water.

Optionally, the control means comprise a user-interface to selectively initiate the water supply mode. Hence, water may be circulated to the brewing chamber automatically or upon a user-request via the user-interface.

The control means may be configured to initiate a brewing mode when the measured parameter matches the referential curve (including a possible tolerance) corresponding to the "capsule closure mode".

The control means can be configured to initiate a rinsing and/or de-scaling mode when the measured parameter matches the referential curve corresponding to the "empty closure mode". In particular, the control means can be configured so that said supplied water is heated at a temperature, such as in the range of 55 to 85° C., lower than the normal brewing temperature, such as in the range of 85 to 98° C.

At least one measured parameter may represent the current consumption of the motor.

The transmission means may include a gear assembly.

The transmission means, in particular a gear assembly, may be configured to provide a transmission ratio of at least 1:100, preferably comprised between 1:200 and 1:300.

The control means can be free of end position sensors in the open position and/or in the closed position. In this case, the measure of the power consumption by the motor may be used to determine the open position and/or closed position. The measure of the power consumption may be correlated with a time evolution to link the consumption to a time-based expected position of the movable assembly, for instance to distinguish the power consumption resulting from reaching an end position from the power consumption resulting from interference with an intermediate undesired obstacle.

Alternatively, the control means may include at least one end position sensor, e.g. two end position sensors in particular for detecting the open position and/or the closed position.

The motorized beverage machine may include an ingredient capsule between the first and second assemblies, the motor being controlled by the control means to move the assemblies from the open position to the closed position to form the brewing chamber to contain the ingredient capsule, the measuring means of the control means being arranged to measure at least one parameter representative of the power consumption of the motor during motion of the assemblies to the closed position with the capsule between the closing assemblies, the comparing means of the control means being arranged to compare the evolution of said measured parameter to the set reference, the input means of the control means being arranged to provide to at least one of said activation means the input resulting from said comparison.

The control means can be configured to detect any abnormal variation in comparison to a referential curve representing the normal evolution of the electrical parameter as a function of time and to:
  initiate a water supply mode when no abnormal variation of the measured parameter relative to the set reference has been detected and the assembly is in a closed position; and/or
  provide a safety input to the motor when an abnormal variation of the measured parameter relative to the set reference is detected.

BRIEF DESCRIPTION OF THE DRAWINGS

The invention will now be described with reference to the schematic drawings, wherein.

DETAILED DESCRIPTION OF THE INVENTION

Figure 1:
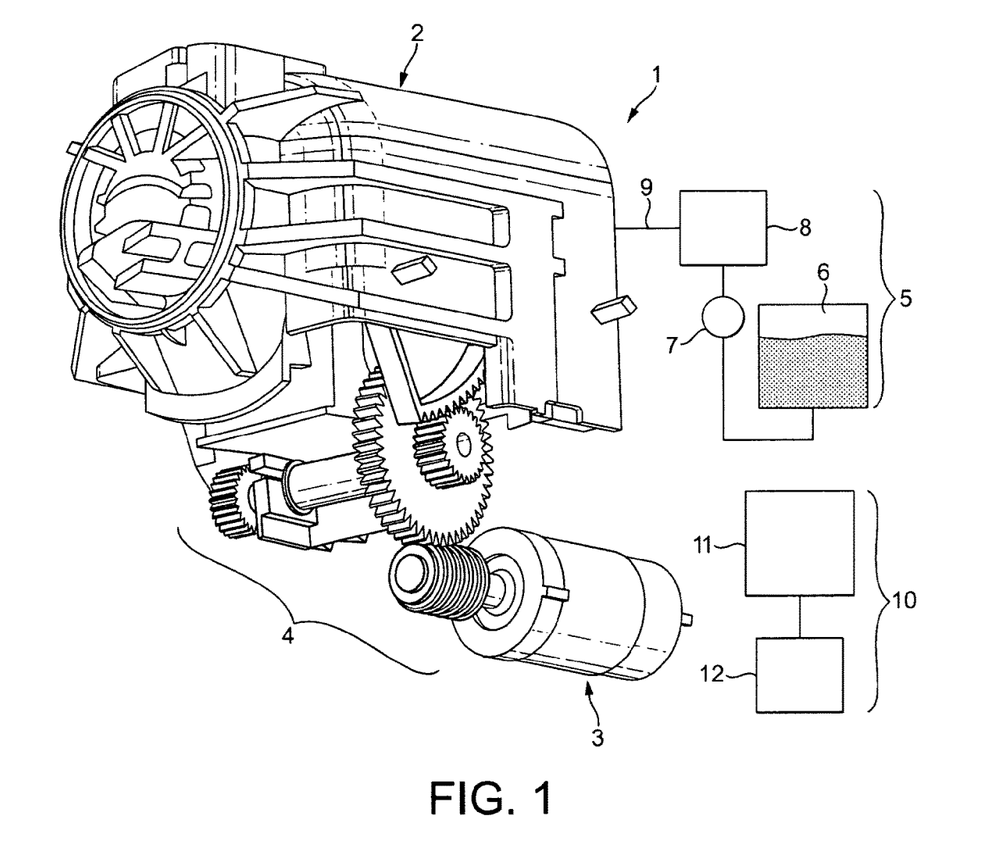
FIG. 1 is a partly schematic and partly perspective view of a beverage machine according to the invention.

An exemplary motorized beverage machine 1 according to the invention is illustrated in FIG. 1. The machine comprises a brewing unit 2 which is connected to an electric motor 3 which drives transmission means 4 for moving brewing unit 2 from an open to a closed position and/or vice versa. Water supply means 5 are also provided as a part of machine 1. Such means 5 may include a water reservoir 6, a water pump 7 and a water heater 8. Water circulates in a water circuit 9 which is linked to brewing unit 2. Typically, circuit 9 is in fluid connection with brewing unit 2. Control means 10 are also provided in machine 1. Control means 10 include a control unit 11, sensors (not represented) and a user interface 12. Control unit 10 includes processor(s), memories and programs enabling to provide appropriate inputs to and receive outputs from the different activation means of the machine in particular, the pump, heater and motor.

Control means 10 may be connected, e.g. wired or wireless, to user interface 12, pump 7, heater 8 and various sensors, such as flow-meters, temperature sensors, pressure sensors, ammeter (e.g. for measuring the current consumption of motor 3) such as a Hall sensor. In particular, control means 11 may control electric power switches and/or current and voltage regulators associated with motor 3, pump 7 and heater 8.

Figure 2:
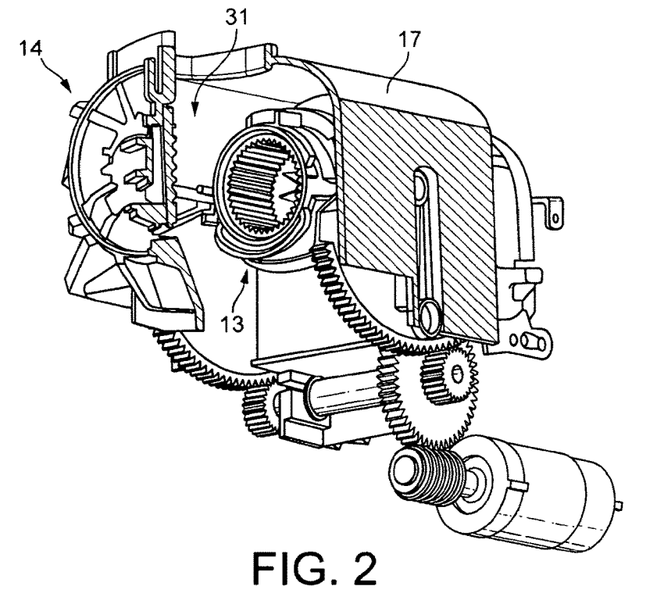
FIG. 2 shows a partial cross-sectional perspective representation of a brewing unit of the beverage machine of FIG. 1 in open position.
Figure 3:
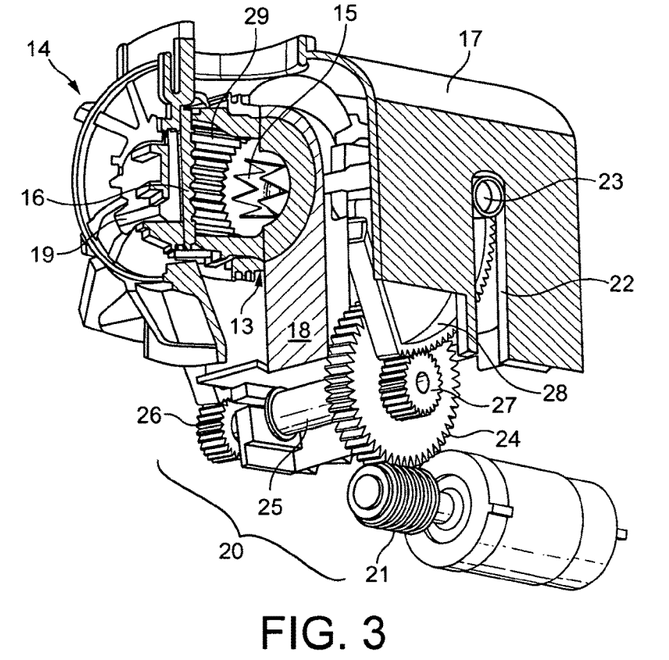
FIG. 3 shows a partial cross-sectional perspective representation of a closed brewing unit of the beverage machine of FIG. 1 in an "empty closure mode"

As shown in FIGS. 2 and 3, brewing unit 2 has a first assembly 13 and a second assembly 14 which are movable relatively one another.

In the context of the present invention, "assembly" may refer to a single component assembling different functions, e.g. mechanical guiding function, mechanical holding function, mechanical piercing function, flow function, pressure function, etc. . . . , and/or refer to a plurality of components assembling the desired functions.

For instance, first assembly 13 is a rear injection assembly 13 and includes a capsule cage with injection blades 15. Front assembly 14 forms a beverage delivery assembly and includes a capsule delivery plate 16. Front assembly 14 is associated to an outer casing 17 and is movable therewith relatively to rear injection assembly 13 which remains fixed to a frame 18 of machine 1. Front delivery assembly 14 includes a beverage outlet 19.

Front delivery assembly 14 is moved relatively to rear injection assembly 13 by means of motor 3 which drives transmission means 4.

In the open position (FIG. 2), a passage 31 is provided between the first and second assemblies 13,14 for allowing the insertion of a capsule 30. The capsule may be positioned in an intermediate position, for example as described in EP 1 646 305 or WO 2009/043630.

Figure 4:
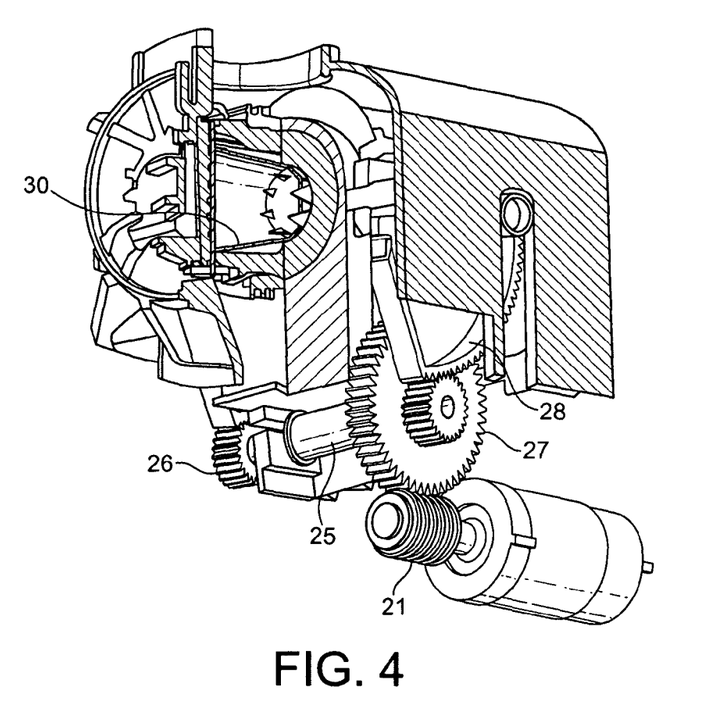
FIG. 4 shows a partial cross-sectional perspective representation of a closed brewing unit of the beverage machine of FIG. 1 in a "capsule closure mode"

In the closed position (FIG. 3), a brewing chamber 29 is formed. Brewing chamber 29 is occupied at least partially by a capsule 30 in a normally closed position of the brewing unit (FIG. 4). The capsule may be of any type and should simply be compatible with brewing chamber 29 and passage 31 for being handled by the assemblies during closure and opening of the brewing unit. Suitable capsules and brewing chambers are for instance disclosed in EP 0 512 468, EP 0 512 470 and EP 2 068 684.

Transmission means 4 may include various mechanical systems. Transmission means 4 may have a force transmission ratio from the motor to the assembly of at least 1:50, in particular from 1:100 to 1:300 to 1:500.

In the embodiment illustrated in FIGS. 1 to 4, transmission means 4 includes a gear assembly 20 linked to a cam 22 and cam-follower 23. For a balanced transmission of the forces on casing 17, cam 22 comprise a pair of elongated grooves located on each side of casing 17. Gear assembly 20 comprises a worm drive 21 connected to the motor axle (i.e. to the rotor of motor 3). Worm drive 21 operates a large gear 24, e.g. a spur gear or helical gear, which is fixed to an axle 25 on which sit two lateral smaller gears 26, 27, e.g. spur gears or helical gears or friction gears. The smaller gears 26, 27 drives a pair of gear segments 28, e.g. spur gears or helical gears or friction gears, which moves cam-follower 23 and, by way of consequence, move cam 22 with the casing 17 from the opened to the closed position and vice versa. In the closed position gear segments 28 with cam-followers 23 are positioned such that the brewing pressure is absorbed across the gear segments without it being transmitted to the rest of the drive system, e.g. radially across the gear segments. However, as explained hereafter, the brewing pressure can be absorbed by the drive system by a suitable configuration.

The gear ratio between worm drive 21 and large gear 24 may be in the range of 1:25 to 1:100, such as 1:50 to 1:80. The gear ratio between small gear 27 and gear segment 28 can be in the range of 1:3 to 1:10, in particular in the range of 1:5 to 1:8.

For instance, the use of a worm drive 21 in transmission 4 can make this transmission unidirectional. In other words, force and movement can only be transmitted from motor 3 to transmission 4 and not vice versa, worm drive 21 acting as a stop in the opposite direction. Hence, no further stop means is needed to maintain the assemblies in a given position. It is sufficient to interrupt the powering of motor 3 to secure assemblies 13,14 in a given position, in particular in the closed or open position.

In a possible solution, both open and closed end positions are geometrically made as "hard stops" with no end switches or sensors.

The input for the motor control may involve the user-interface, the current absorption of the motor and a timer of the control unit.

Figure 5:
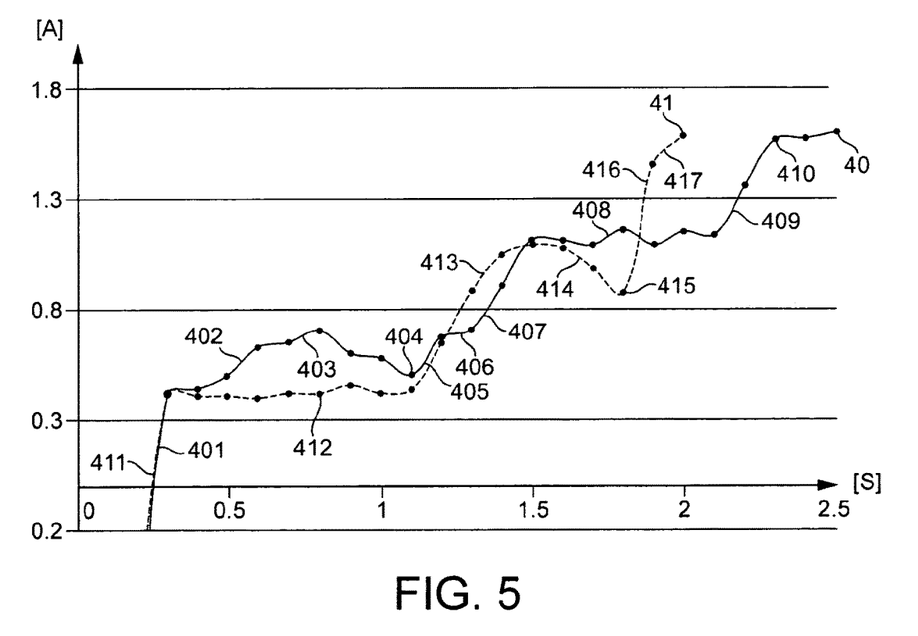
FIG. 5 shows a graphic of referential curves of the current absorption of the motor as a function of time in a "capsule closure mode" and in an "empty closure mode".

As illustrated in FIG. 5, two different typical curves 40,41 can be detected over time, e.g. by measuring the power consumption of motor 3, for example by measuring the current consumption of motor 3, in particular when motor 3 is a DC motor, e.g. operated at generally constant voltage.

Curve 40 represents the evolution over time of the current consumption of motor 3 in the "capsule closure mode". The closed state of brewing unit 2 in the capsule closure mode is represented in FIG. 4 with a capsule 30 enclosed in the closed brewing chamber.

Curve 41 represents the evolution of the current consumption of motor 3 in the "empty closure mode". The closed state of brewing unit 2 in the empty closure mode is represented in FIG. 3.

Hence, curves 40,41 correspond to a closure movement of assemblies 13,14 of brewing unit 2. Likewise, curves can be determined for the opening movements, e.g. with and without capsule 30 inbetween assemblies 13,14. Such opening curves can be used as a reference set to detect possible disturbances of an opening movement of assemblies 13,14, e.g. jamming of a human body part such as a finger between a housing of the machine and a therein movable assembly of brewing unit 2.

Control unit 10 of machine 1 is configured for comparing the variation of the actual current consumption to referential curves 40 and 41 depending on the relevant mode the brewing unit is engaged in. Such configuration is obtained by software.

If a capsule 30 is inserted in brewing unit 2, and no abnormal variation of the current absorption is detected in comparison to curve 40, e.g. no variation exceeding 20% of the typical current consumption curve 40, a brewing cycle can be initiated. The start of brewing cycle can be triggered by a command or request on the user's interface 12. Alternatively, the start of the brewing cycle can be triggered automatically by the reaching of the closed position.

If no capsule is inserted into brewing chamber 2 and no abnormal variation of the variation of the current absorption is detected in comparison to curve 41, a rinsing and/or de-scaling mode with reduced temperature to allow optimal de-scaling and/or save energy is initiated in the closed position (FIG. 3). The start of rinsing and/or de-scaling cycle can also be triggered by a command or request on the user's interface 12. Alternatively, the start of the rinsing and/or de-scaling cycle can be triggered automatically by the reaching of the closed position. If no capsule is inserted into brewing chamber 2 and no abnormal variation of the variation of the current absorption is detected in comparison to curve 41, a cup-preheating mode may be initiated that involves the dispensing of heated water into a user-cup for preheating thereof prior to preparing and dispensing a beverage. Preheating of the cup may be carried out at beverage preparation temperature or at a reduced temperature.

More specifically, curve 40 illustrating an exemplary evolution of current consumption over time by motor 3 when a capsule 30 is inserted into brewing unit 2, includes various phases:

An initial portion 401, i.e. a sharp increase of current consumption reflects the start of motion of the movable assembly, in particular the power consumption needed to overcome the static friction forces. A second portion 402, starts at a level slightly below the top of portion 401 (the dynamic friction forces being lower than the static friction forces) and increases slowly. This portion illustrates the increasing resistance caused by a capsule 30 progressively entering brewing chamber 29 during closure. A maximum 403 is reached when capsule 30 is forced out of an intermediate position in which it is supported by stop members, e.g. as explained in EP 2 103 236. Thereafter, the current consumption drops slightly until it reaches a minimum 404. The current consumption 405,406,407 increases due to the deformation and progressive piercing of capsule 30 by blades 15 during closure. The more or less flat portion 408 represents the final approach of the assemblies. The current increase 409 reflects the power needed to stress a biasing spring (not shown) for a play take-up between the assemblies in the closed position. Once the current consumption reaches maximum 410, the maximum power is consumed by motor 3 which indicates that the motor 3 is blocked: the assemblies are in their closed position.

Curve 41 illustrating an exemplary evolution of current consumption over time by motor 3 when no capsule is inserted into brewing unit 2, includes various phases:

Portion 411 corresponds to portion 401, i.e. the movable assembly is put in motion. Once the assembly is motion, portions 412,413 and 414 illustrate essentially the force distribution of the rotating cam-follower 23 moving in the straight grooves 22 and assembly 13 moving generally perpendicularly to the direction of grooves 22. Portion 416,417 illustrate the power consumption increase due to stressing the biasing spring. Like above, once the current consumption reaches maximum 417, the maximum power is consumed by motor 3 which indicates that the resistance against motor 3 is complete: the assemblies are in their closed position.

As illustrated in FIG. 5 by way of example, the time needed for closing the assemblies when no capsule is inserted into brewing unit 2, is slightly shorter, approx 0.5 sec, than when motor 3 has to overcome additional forces caused by the presence of a capsule 3. Overall, closure can be achieved within 2 or 2.5 sec, as illustrated with this particular embodiment of the invention.

The time needed for opening of closing the assemblies of a brewing unit may typically be in the range of 1 to 10 seconds.

When the measure of the current absorption does not match the two above mentioned curves 40, 41, in particular, when the current consumption significantly exceeds the curve before reaching the closed position, it can be expected that an undesirable obstacle is located between the assemblies or that the system is jammed or suffers from another malfunction. Consequently, a safety input can be activated. The safety input preferably comprises the operation of inverting the motor action to move the movable assembly back into the open position. Alternatively, the safety input may amount to reducing or stopping the drive action of the motor. This safety measure protects for example the user from jamming a finger in the running mechanism. For example, the safety input may be triggered when the resistance against closure of the assemblies exceeds 50, 80, 100, 125 or 150 N before reaching the closed position. For instance, the safety input may be triggered when an excessive resistance occurs at a distance between the assemblies before closure which is greater than 1 or 2 mm, in particular greater than 3 mm or 4 mm.

The gear assembly is preferably configured to provide a gear ratio of at least 1:100, preferably comprised between 1:200 and 1:500 such as between 1:250 and 1:450, e.g. 1:300. Due to this relatively high gear ratio, another benefit of the present invention comes from the possibility to use relatively low power motor, for example comprised between 20-50 mNm.

Motor 3 can be a low power motor configured to generate a maximum torque of no more than 50 mNm; and/or consume a maximum power of no more than 50 watt, for driving movable assembly 14 between the open and closed positions. and/or not exceeding 50 watt. For instance, motor 3 is arranged to generate a maximum torque of at least 20 mNm, in particular a maximum torque in the range of 25 to 40 mNm. Motor 3 can be arranged to consume a maximum power in the range of 7 to 25 watt, in particular 10 to 15 watt.

The motor can have an angular speed of up to 10K RPM, such as from 0 to 5000 RPM.

By providing a low power motor, it is possible to simplify the construction and control of the motorized machine. As compared to high power motors, a low power motor has a smaller inertia due to the reduced mechanical inertia and lower power load. Hence, temporary variations of the force (or torque) required from the motor, e.g. to overcome an obstacle or additional friction, is not or less absorbed by the dampening effect of the mechanical inertia and electric load of the motor but timely translated in a temporary increase of required electric powering of the motor. Moreover, since the motor has a lower mechanical and electric inertia, interrupting the powering of the motor is not followed by a significant discharge of the energy load (mechanical and electric) of the motor into the mechanical system. It follows that by using a low power motor, the actual mechanical behaviour of the relatively movable assemblies can be monitored via the power consumption of the motor. Moreover, the machine does not require end position sensors to stop the motor when it is about to reach the end positions. The reaching of an obstacle at the end position can be nearly instantaneously identified by monitoring the power consumption of the motor the powering of which can be stopped without the risk of the motor forcing the assemblies detrimentally beyond the end position by discharging its mechanical and electric inertia.

The invention claimed is:

1. A motorized beverage machine comprising:
   a brewing unit comprising a first assembly and a second assembly that cooperate together, each assembly defining a part of a brewing chamber for containing an ingredient capsule, at least one of the assemblies is a movable assembly that is (i) movable away from the cooperating assembly into an open position within the machine to form between the assemblies a passage through which an ingredient capsule passes during an action selected from the group consisting of insertion of the ingredient capsule into the brewing unit, removal of the ingredient capsule from the brewing unit, and combinations thereof, and (ii) movable to the cooperating assembly into a closed position to form the brewing chamber; and
   an activation member including a motor to drive the movable assembly between the open and closed positions, a transmission to transmit a drive action from the motor to the movable assembly, a water supply to supply heated water to the brewing chamber, and a controller,
   the controller configured to (i) control the drive action of the motor, (ii) measure at least one electrical parameter representative of a consumption of power by the motor, (iii) compare to a set reference an evolution of the measured electrical parameter as a function of time during the transfer of the assembly from the open position to the closed position, the set reference comprising a first referential curve, (iv) provide to the activation member an input resulting from the comparison of the evolution of the measured electrical parameter to the set reference, and (v) initiate a brewing mode when the measured electrical parameter matches the first referential curve.

2. The machine of claim 1, wherein a safety input is provided to the motor when detecting a variation of the measured electrical parameter relative to the set reference which is abnormal.

3. The machine of claim 2, wherein the variation is deemed abnormal when the measured electrical parameter is selected from the group consisting of exceeds a level that is at least 20% above the set reference;
corresponds to a resistance to closure caused by the presence of an obstacle between the assemblies moving towards the closed position and prior to reaching thereof; and
combinations thereof.

4. The machine of claim 2, wherein the safety input comprises inverting the drive action of the motor to move the movable assembly into the open position or reducing or stopping the drive action of the motor.

5. The machine of claim 2, wherein the controller is configured to detect the abnormal variation in comparison to the first referential curve, the first referential curve representing a normal evolution of the measured electrical parameter as a function of time corresponding to a mode selected from the group consisting of
a capsule closure mode in which the movable assembly is moved into the closed position with an ingredient capsule inserted in the brewing chamber;
an empty closure mode in which the movable assembly is moved into the closed position with no capsule inserted in the brewing chamber; and
combinations thereof.

6. The machine of claim 5, wherein a water supply mode comprising supplying heated water to the brewing chamber is initiated when no abnormal variation of the measured electrical parameter relative to the set reference has been detected and the movable assembly is in the closed position.

7. The machine of claim 6, wherein the controller is configured to perform an action selected from the group consisting of initiate a rinsing mode when the measured electrical parameter matches a second referential curve corresponding to an empty closure mode, initiate a descaling mode when the measured electrical parameter matches the second referential curve corresponding to the empty closure mode, and combinations thereof.

8. The machine of claim 1, wherein the at least one measured electrical parameter represents absorption of current by the motor.

9. The machine of claim 1, wherein the transmission comprises a gear assembly.

10. The machine of claim 9, wherein the gear assembly is configured to provide a gear ratio of at least 1:100.

11. The machine of claim 1, wherein the controller unit is not connected to any end position sensors in the open position and not connected to any end position sensors in the closed position.

12. The machine of claim 1, wherein the controller is connected to at least one end position sensor.

13. The machine of claim 1, which comprises an ingredient capsule between the first and second assemblies, the motor being controlled by the controller to move the first and second assemblies from the open position to the closed position to form the brewing chamber to contain the ingredient capsule, the controller being configured to measure the at least one electrical parameter representative of the consumption of power by the motor during motion of the first and second assemblies to the closed position with the capsule between the closing assemblies, compare the evolution of the measured electrical parameter to the set reference, and provide to the activation member the input resulting from the comparison.

14. The machine of claim 13, wherein the controller is configured to detect any abnormal variation in comparison to the first referential curve, the first referential curve representing the normal evolution of the measured electrical parameter as a function of time, and to perform an action selected from the group consisting of
initiate a water supply mode when no abnormal variation of the measured electrical parameter relative to the set reference has been detected and the assembly is in the closed position;
provide a safety input to the motor when an abnormal variation of the measured electrical parameter relative to the set reference is detected; and
combinations thereof.

15. A motorized beverage machine comprising:
a brewing unit comprising a first assembly and a second assembly and defining part of a brewing chamber for containing an ingredient capsule;
at least one of the first and second assemblies is a movable assembly that is movable away from the other assembly into an open position within the machine and movable toward the other assembly into a closed position;
a motor to drive the movable assembly between the open and closed positions;
a transmission to transmit a drive action from the motor to the movable assembly;
a water supply to supply heated water to the brewing chamber; and
a controller configured to (i) control the drive action of the motor, (ii) measure at least one electrical parameter representative of a consumption of power by the motor, (iii) compare to a set reference an evolution of the measured electrical parameter as a function of time during the transfer of the assembly from the open to the closed position, the set reference comprising a first referential curve, (iv) provide to the motor an input resulting from the comparison of the evolution of the measured electrical parameter to the set reference, and (v) initiate a brewing mode when the measured electrical parameter matches the first referential curve.

16. The motorized beverage machine of claim 15, wherein the input from the controller is an amount of power to the motor that maintains a predetermined motor output speed.

17. A motorized beverage machine comprising:
a brewing unit comprising a first assembly and a second assembly and defining part of a brewing chamber for containing an ingredient capsule;
at least one of the first and second assemblies is a movable assembly that is movable away from the other assembly into an open position within the machine and movable toward the other assembly into a closed position, in a capsule closure mode the movable assembly is moved into the closed position with the ingredient capsule inserted in the brewing chamber, in an empty closure mode the movable assembly is moved into the closed position with no capsule inserted in the brewing chamber;
a motor to drive the movable assembly between the open and closed positions;
a transmission to transmit a drive action from the motor to the movable assembly;
a water supply to supply heated water to the brewing chamber; and
a controller configured to control the drive action of the motor, measure a consumption of power by the motor, compare an evolution of the measured consumption of power as a function of time during the transfer of the movable assembly from the open to the closed position to (i) a first referential curve when the movable assembly is in the capsule closure mode or (ii) a second referential curve when the movable assembly is in the empty closure mode, the first referential curve representing a normal evolution of the consumption of power as a function of time in the capsule closure mode, the second referential curve representing a normal evolution of the consumption of power as a function of time in the empty closure mode;

the controller is configured to invert, stop or reduce the drive action of the motor when the evolution of the consumption of power varies from the respective referential curve more than a predetermined tolerance margin;

the controller is configured to initiate a brewing mode when the evolution of the consumption of power is compared to the first referential curve and does not vary from the first referential curve more than a predetermined tolerance margin; and the controller is configured to perform an action selected from the group consisting of initiate a rinsing mode, initiate a de-scaling mode, and combinations thereof when the evolution of the consumption of power is compared to the second referential curve and does not vary from the second referential curve more than a predetermined tolerance margin.

18. The motorized beverage machine of claim 1, wherein the at least one measured electrical parameter comprises absorption of current by the motor, and the controller is configured to use the absorption of current by the motor to determine a presence or an absence of the ingredient capsule and initiate a brewing cycle based at least partially on the presence or the absence of the ingredient capsule.

19. The motorized beverage machine of claim 1, wherein the transmission comprises a worm drive.

* * * * *